(12) United States Patent
Uhler

(10) Patent No.: US 9,233,265 B2
(45) Date of Patent: Jan. 12, 2016

(54) POSITIONABLE OUTLET FOR A WATER MONITOR

(71) Applicant: Akron Brass Company, Wooster, OH (US)

(72) Inventor: Adam Uhler, Sterling, OH (US)

(73) Assignee: Akron Brass Company, Wooster, OH (US)

( * ) Notice: Subject to any disclaimer, the term of this patent is extended or adjusted under 35 U.S.C. 154(b) by 68 days.

(21) Appl. No.: 14/200,589

(22) Filed: Mar. 7, 2014

(65) Prior Publication Data

US 2014/0224347 A1    Aug. 14, 2014

Related U.S. Application Data

(63) Continuation of application No. 13/921,696, filed on Jun. 19, 2013, now Pat. No. 8,678,022.

(60) Provisional application No. 61/663,526, filed on Jun. 22, 2012.

(51) Int. Cl.
*A62C 31/00* (2006.01)
*F16L 27/12* (2006.01)
*F16L 27/08* (2006.01)

(52) U.S. Cl.
CPC .............. *A62C 31/00* (2013.01); *F16L 27/0816* (2013.01); *F16L 27/0828* (2013.01); *F16L 27/12* (2013.01);
(Continued)

(58) Field of Classification Search
CPC ...... B05B 15/08; A62C 31/00; A62C 31/005; F16L 27/12; F16L 27/0816; F16L 27/0828; Y10T 137/8807

USPC .......................................................... 137/615
See application file for complete search history.

(56) References Cited

U.S. PATENT DOCUMENTS 3,612,408 A    10/1971  Holleman
4,354,522 A *  10/1982  Bormioli .................. 137/614.02
(Continued)

FOREIGN PATENT DOCUMENTS

DE    1425515    12/1969
DE    1952689    5/1971
(Continued)

OTHER PUBLICATIONS

StreamMaster Electric Monitor Style 3578 product sheet, Akron Brass Company, www.akronbrass.com, Feb. 2012.
(Continued)

*Primary Examiner* — Kevin Lee
(74) *Attorney, Agent, or Firm* — Brouse McDowell; Michael G. Craig; Heather M. Barnes

(57) ABSTRACT

A water monitor includes a stationary portion having a fluid inlet. A movable portion has a first piece rotatably coupled to the stationary portion and a second piece rotatably coupled to the first piece. The first piece has a first sleeve and an opposing second sleeve configured to rotatably couple to the second piece. The second piece has an inlet portion and a fluid outlet. The inlet portion includes a fluid opening and is configured to extend through the first sleeve and the second sleeve. A fluid flow path extends between the fluid inlet and the fluid outlet and is configured to communicate fluids from the fluid inlet to the fluid outlet. A power transmission is coupled to the inlet portion adjacent the first sleeve and the fluid flow path bypasses the power transmission. The movable portion is rotatable with respect to the stationary portion to position the fluid outlet.

20 Claims, 15 Drawing Sheets

(52) U.S. Cl.
CPC ...... *Y10T 137/0402* (2015.04); *Y10T 137/0441* (2015.04); *Y10T 137/0491* (2015.04); *Y10T 137/8593* (2015.04); *Y10T 137/8807* (2015.04)

(56) References Cited

U.S. PATENT DOCUMENTS

| | | | |
|---|---|---|---|
| 4,392,618 | A | 7/1983 | Evans et al. |
| 4,506,738 | A | 3/1985 | Evans et al. |
| 4,679,732 | A | 7/1987 | Woodward |
| 4,697,742 | A | 10/1987 | Schnipke |
| 4,793,557 | A | 12/1988 | Marchese et al. |
| 5,425,505 | A | 6/1995 | Jones |
| 5,848,444 | A | 12/1998 | Christopherson |
| 5,997,047 | A | 12/1999 | Pimentel et al. |
| 6,439,478 | B1 | 8/2002 | King et al. |
| 6,655,613 | B1 | 12/2003 | Brown |
| 7,066,411 | B2 | 6/2006 | Male et al. |
| 7,137,578 | B2 | 11/2006 | Steingass et al. |
| 7,337,808 | B2 | 3/2008 | Shamir et al. |
| RE40,441 | E | 7/2008 | Kolacz et al. |
| 7,644,777 | B2 | 1/2010 | Combs et al. |
| 2003/0077110 | A1 | 4/2003 | Knowles |
| 2006/0091241 | A1 | 5/2006 | Trapp et al. |
| 2006/0231648 | A1 | 10/2006 | Male et al. |
| 2009/0000795 | A1 | 1/2009 | Combs et al. |
| 2009/0107687 | A1 | 4/2009 | Combs et al. |
| 2009/0226243 | A1 | 9/2009 | Krywitsky |
| 2009/0277656 | A1 | 11/2009 | Combs |
| 2010/0147978 | A1 | 6/2010 | Vanagosoom |
| 2011/0162718 | A1 | 7/2011 | Uhler |
| 2014/0048153 | A1* | 2/2014 | Prahl ............................ 137/342 |

FOREIGN PATENT DOCUMENTS

| | | |
|---|---|---|
| DE | 29600355 U1 | 6/1997 |
| GB | 485161 | 5/1938 |
| JP | 2007021988 A | 2/2007 |

OTHER PUBLICATIONS

Mekanizmalar, http://web.archive.org/web/20071221225632/http://www.mekanizmalar.com/fourbar01.shtml, published date: Dec. 21, 2007.
Stang Industrial Products: Oscill., water DRV., 4.0" NOM, Part No. (105425-91), Drawing Date Jun. 27, 2002, http://web.archive.org/web/20060501085616/http://www.stangindustrial.com/site/pages/pro06.html, Publish Date: May 1, 2006.
Akron Brass, Severe Duty Monitor, Wooster, Ohio, 2012.
Chemguard Specialty Chemicals & Equipment, Water Powered Oscillating Mechanism, Sep. 2005, 2 pages, Mansfield, Texas.
PDF, photograph depicting a backhoe linkage, prior to Jun. 2013.
Renegade Electric Monitor style 3580 product cut sheets, Akron Brass Company, www.akronbrass.com, Feb. 2012.
International Search Report, Patent Cooperation Treaty Application No. PCT/US2013/046757, mailed Sep. 20, 2013.
International Preliminary Report on Patentability, PCT Application No. PCT/US2013/046757, mailed on Dec. 31, 2014, 8 pages.

\* cited by examiner

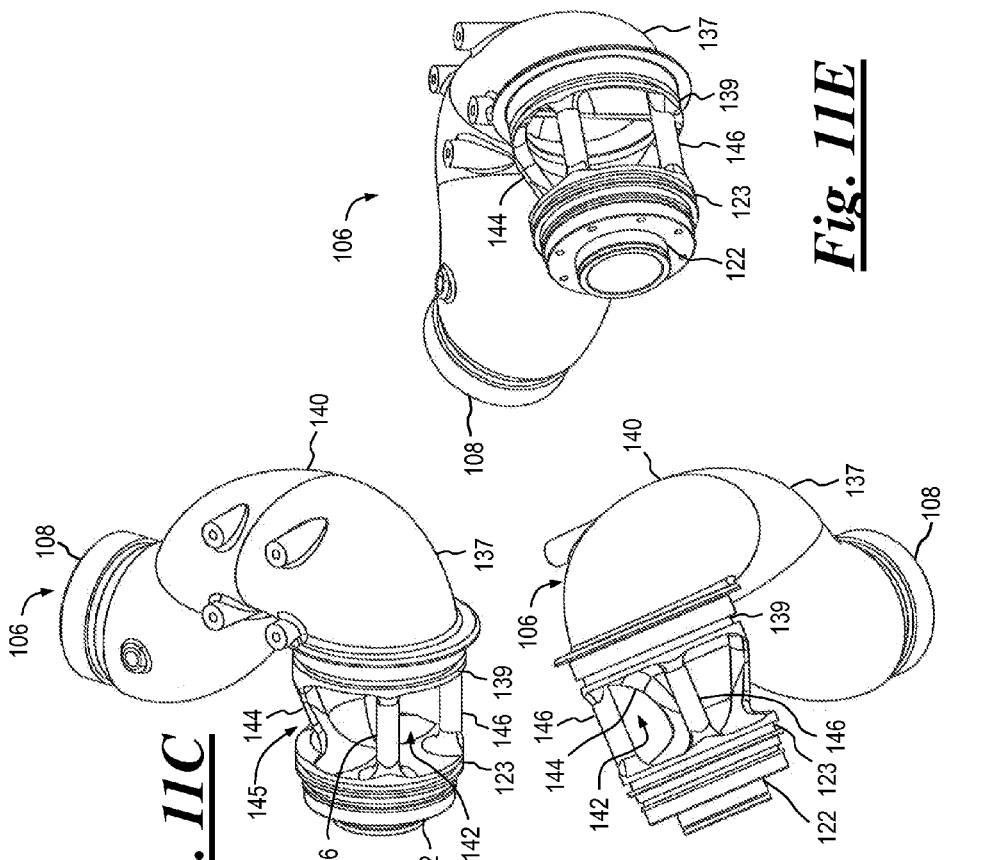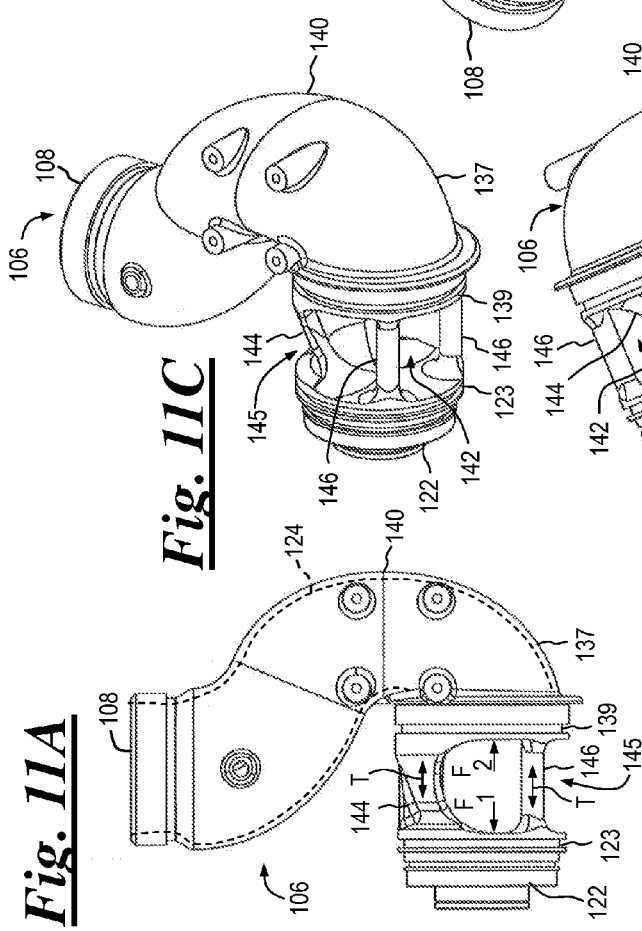

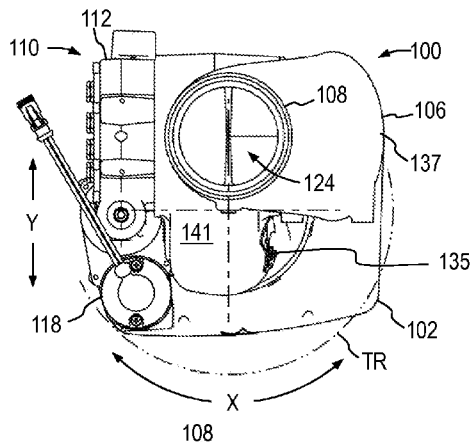
*Fig. 12A*
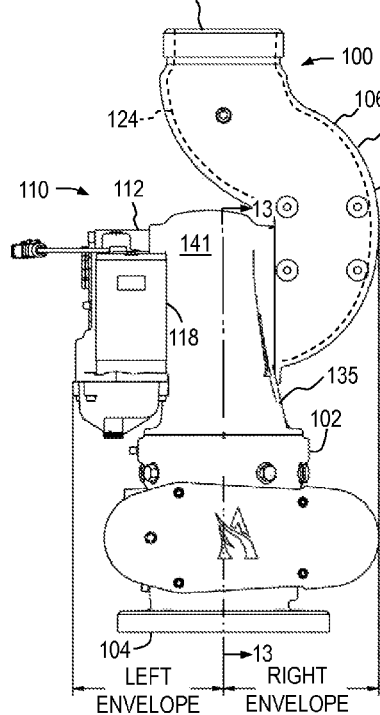 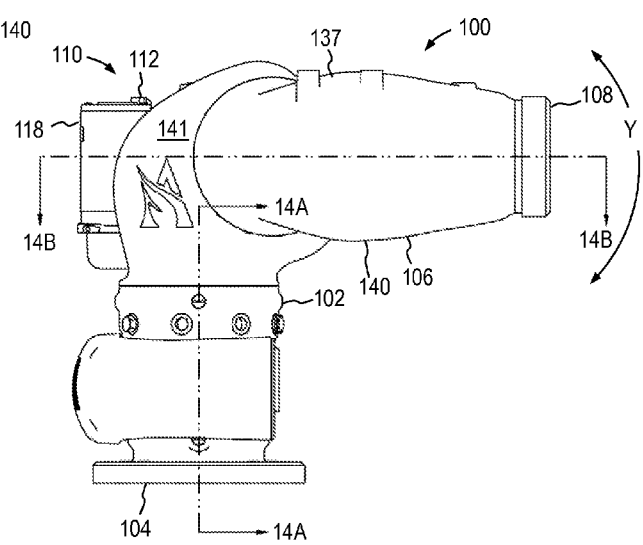
*Fig. 12B*  *Fig. 12C*

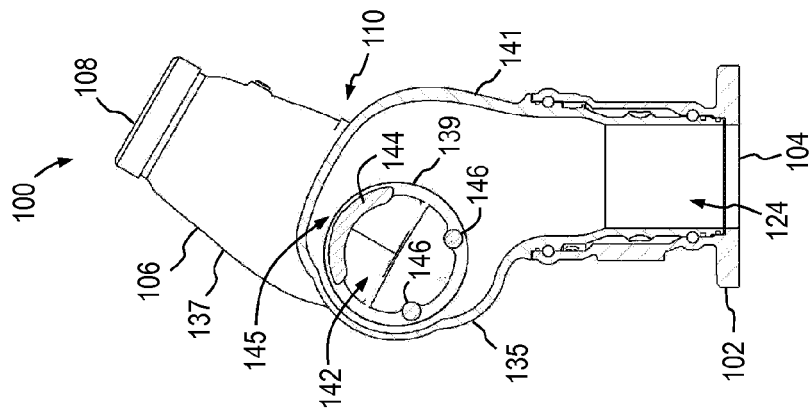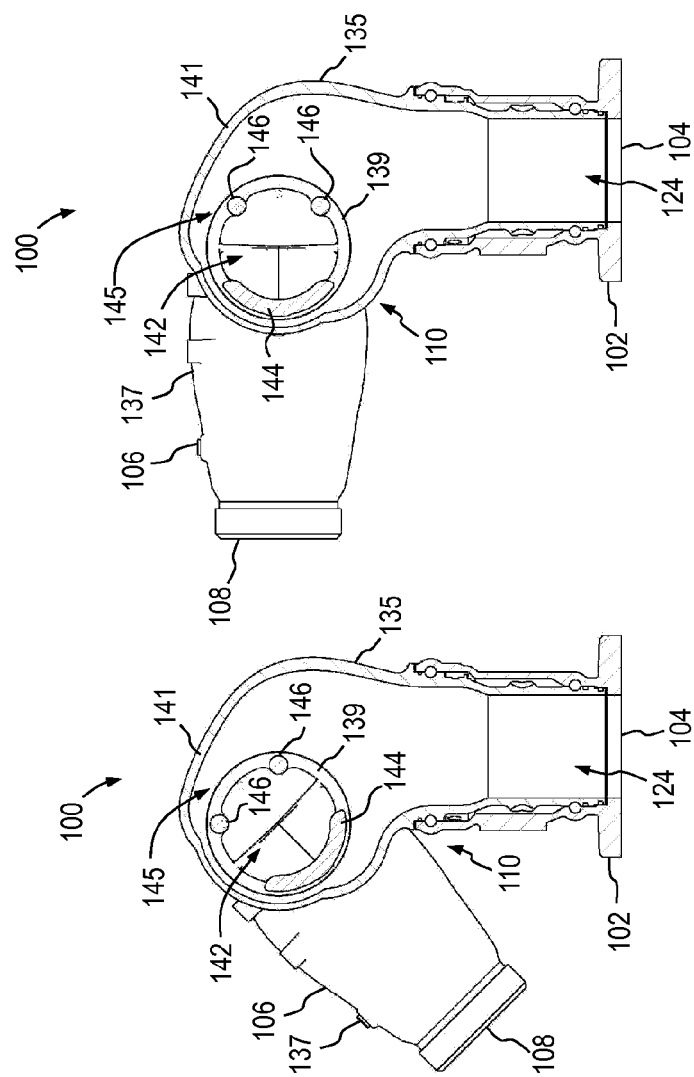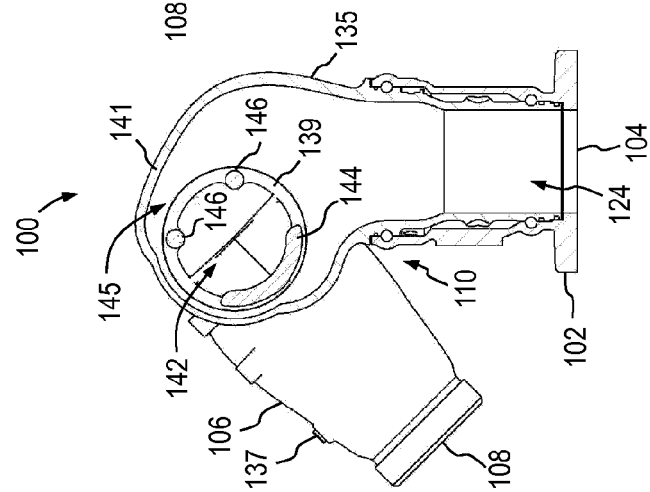
*Fig. 13A*   *Fig. 13B*   *Fig. 13C*

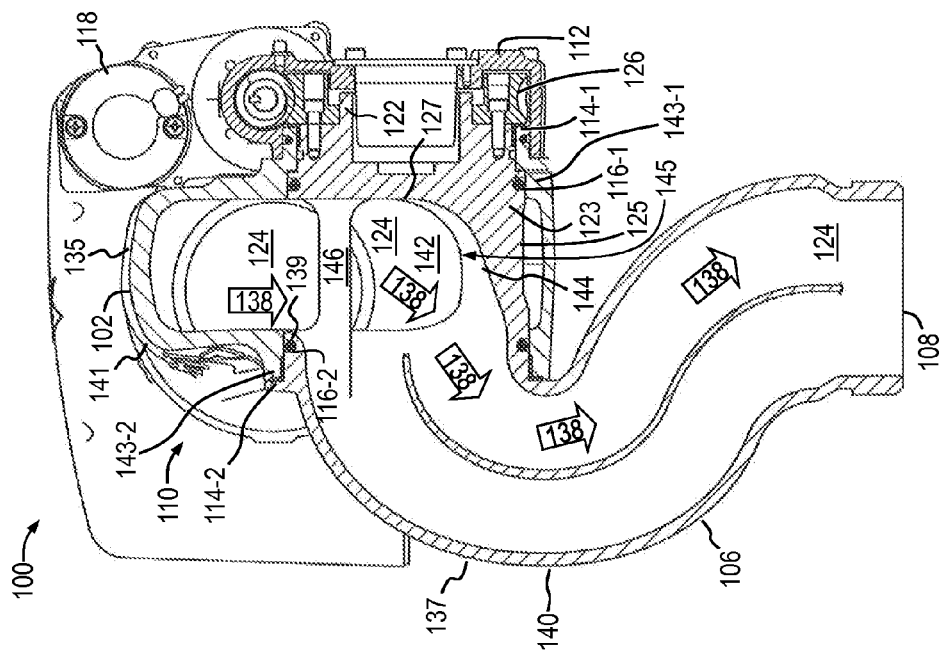
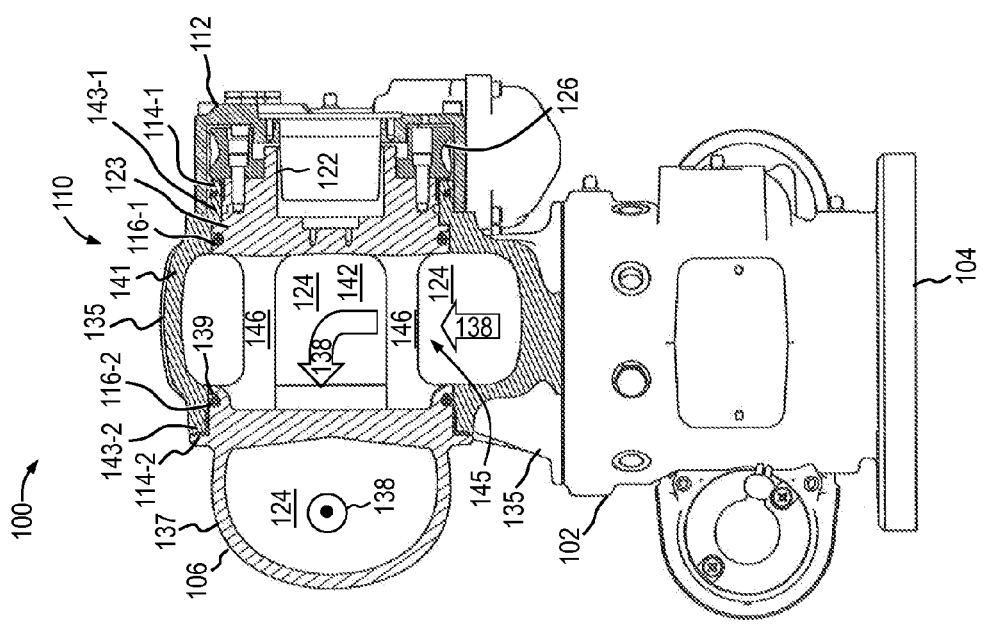

POSITIONABLE OUTLET FOR A WATER MONITOR

CROSS-REFERENCE TO RELATED APPLICATIONS

This application is a continuation of U.S. patent application Ser. No. 13/921,696, filed Jun. 19, 2013, now U.S. Pat. No. 8,678,022, which claims priority to U.S. provisional application No. 61/663,526, filed Jun. 22, 2012. The entire contents of each of these applications is expressly incorporated by reference thereto.

FIELD

The present invention relates generally to equipment for directing fluids, in particular to water monitors used to direct fluids toward hazards such as fires.

BACKGROUND

Water monitors, also referred to as "water turrets," "water cannons," "fire-fighting monitors," "fluid monitors," "monitors" and the like are used to manually or automatically distribute high-pressure streams of foam, water, water-based foam and fire retardants over an area determined by the amount of fluid pressure, the angle of elevation of the water monitor, its arc of azimuthal oscillation, its speed of azimuthal oscillation and its pattern of azimuthal oscillation. Water monitors are primarily used to extinguish fire hazards, although other uses may include fire prevention, irrigation, crowd control, and water-cooling of objects.

Water monitors are often configured with a fluid input portion that is fixed, stationary or otherwise non-moving (hereafter generally "stationary" herein) with respect to a fluid output portion. The fluid output portion is usually movable and is positionable to a select azimuth and/or elevation. Such water monitors typically utilize one or more electric motors and reduction-gear assemblies (hereafter "gearboxes") to convert a relatively high-speed, low-torque output of the motors to a relatively low-speed, higher-torque force for moving a fluid outlet of the water monitor to a select position.

Positionable water monitors are usually configured with ball bearings interposed between the stationary portion and the movable fluid outlet elbow to reduce rotational friction between these components and to support radial and axial loads exerted upon the movable portion. A pair of races are utilized to contain a plurality of balls and to transmit the loads through the balls, one race being formed in the stationary portion and a facially adjacent race being formed in the rotatable portion. As the race in the rotatable portion moves it causes the balls to rotate as well. Because the balls are rolling they have a lower coefficient of friction than if two flat surfaces were rotating upon each other.

A significant drawback of this arrangement is that fluids flowing through the water monitor at high pressure exert a separating force upon the bearings. This separating force adds to the mechanical load imposed upon the aforementioned electric motors and gearboxes, and can result in excess component wear and reduced service life for these components. Utilizing electric motors and gearboxes rated for higher loads may be utilized to counter this problem, but such an approach requires components that are more expensive, physically larger, and have greater weight when compared to electric motors and gearboxes designed for smaller loads.

SUMMARY

A water monitor having a positionable fluid outlet is disclosed according to an embodiment of the present invention. The water monitor includes a stationary portion having a fluid inlet and a movable portion that is rotatably coupled to the stationary portion, the movable portion having a fluid outlet. A gearbox interposed between the stationary portion and the movable portion converts a relatively high-speed, low-torque rotary motion from an electric motor to a relatively low-speed, higher-torque output. The gearbox is placed outside a fluid flow path extending between the fluid inlet and the fluid outlet of the water monitor. The water monitor utilizes a minimal number of bends in the fluid flow path, thereby reducing pressure drops in the fluid flow due to the bends, while also achieving a relatively compact size for the water monitor.

In one embodiment of the present invention a water monitor includes a stationary portion having a fluid inlet. A movable portion having a fluid outlet is coupled to the stationary portion. A fluid flow path extends between the fluid inlet and the fluid outlet, and is configured to communicate fluids from the fluid inlet to the fluid outlet. A power transmission is coupled to the movable portion such that the fluid flow path does not extend through (i.e., "bypasses") the power transmission. The movable portion is rotatable with respect to the stationary portion to position the fluid outlet.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 11A, 11B, 11C, 11D and 11E are views of a movable portion of a water monitor according to an embodiment of the present invention;

FIGS. 12A, 12B and 12C are top, side and end views respectively of a water monitor according to an embodiment of the present invention;

FIGS. 13A, 13B and 13C are views in section showing rotation of a movable portion of a water monitor with respect to a stationary portion of the water monitor according to an embodiment of the present invention;

FIGS. 14A and 14B are views in section of a water monitor according to an embodiment of the present invention.

DETAILED DESCRIPTION

Figure 1:
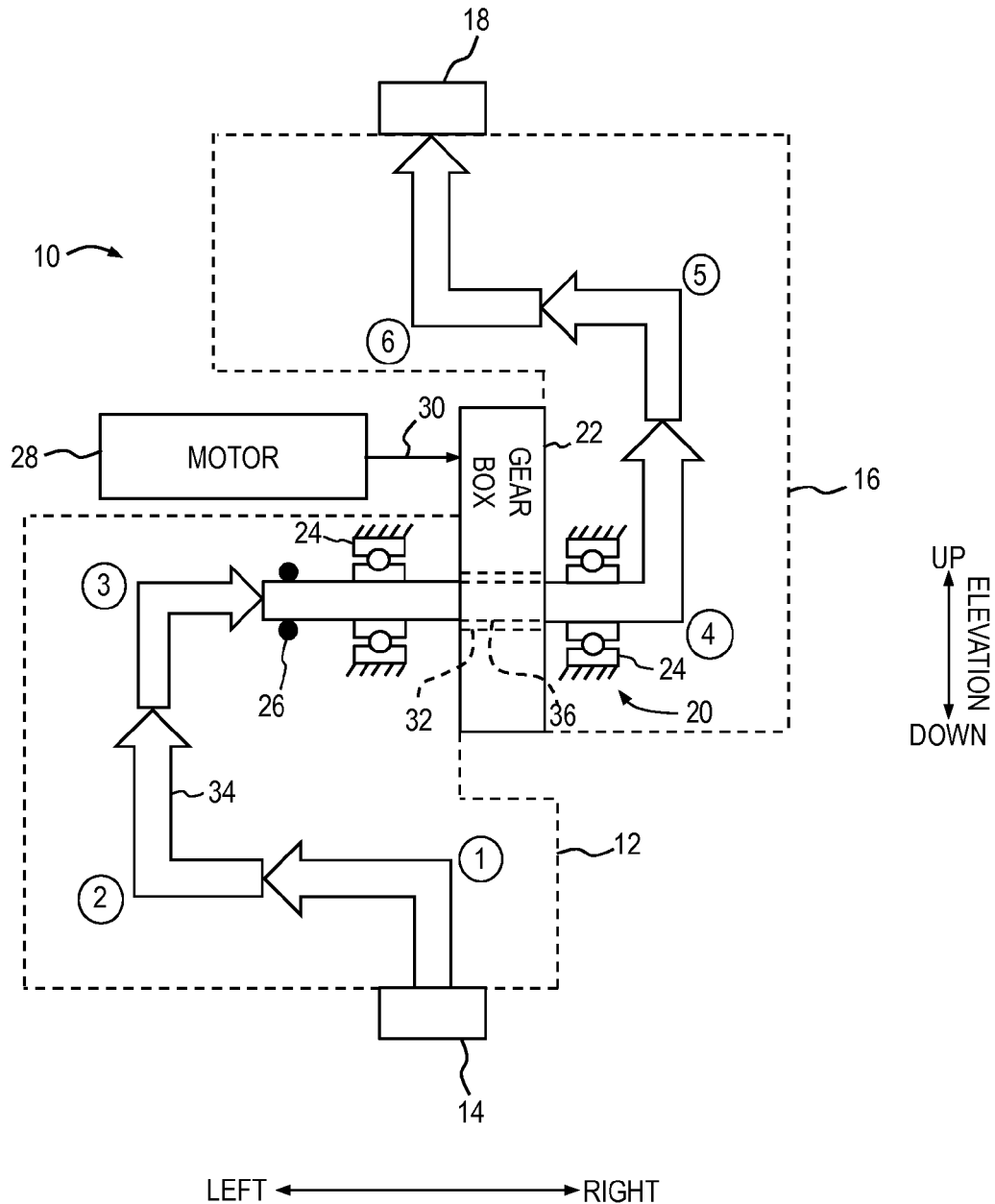
FIG. 1 is a schematic diagram of a prior art water monitor.

In the discussion that follows, like reference numerals are used to refer to like elements and structures in the various figures and embodiments of the present invention.

A schematic block diagram of a prior art water monitor 10 is shown in FIG. 1. Water monitor 10 comprises a stationary portion 12 (i.e., stationary with respect to elevational movement) and a fluid inlet 14. A movable portion 16 (i.e., movable with respect to elevational movement) is rotatably coupled to the stationary portion, the movable portion having a fluid outlet 18.

A rotating joint 20, which allows fluid outlet 18 to be selectably positioned in the elevation direction, is made up of a gearbox 22, one or more bearings 24, and one or more seals 26. Rotating joint 20 is oriented perpendicularly to fluid outlet 18 so that the fluid outlet is positionable about an elevational arc.

Gearbox 22, which is interposed between stationary portion 12 and movable portion 16, converts a relatively high-speed, low-torque rotary motion from an electric motor 28 to a relatively low-speed, higher-torque output. In operation, rotary motion from an output 30 of motor 28 is converted to a relatively low-speed, higher-torque output by gearbox 22. The output of gearbox 22 is coupled to movable portion 16 such that actuating motor 28 causes the movable portion to rotate with respect to stationary portion 12, thereby moving fluid outlet 18 to a select elevational position.

Gearbox 22 typically comprises a worm gear and a worm wheel 32 for speed reduction and torque amplification, the worm wheel being situated in a fluid flow path or "waterway" 34 (represented by block arrows in FIG. 1) extending between fluid inlet 14 and fluid outlet 18 such that fluid flowing in the fluid flow path passes through an open center 36 of worm wheel 32. Water monitor 10 suffers from undesirable pressure drop from fluid inlet 14 to fluid outlet 18 due to restrictions presented by the open center 36 of worm wheel 32. Further restrictions to fluid flow in fluid flow path 34 are due to the number of bends in waterway 34 needed to achieve a relatively compact package size for the water monitor, the bends being shown as right angles in the block arrows of FIG. 1 and labeled with encircled numbers 1 through 6.

In order for the movable portion 16 to rotate with respect to elevation, the rotating elevation joint 20 and thus, waterway 34, must be perpendicular to the fluid outlet 18 orientation direction. Therefore, waterway 34 is turned unnecessarily between bend 1 and bend 3 to accommodate the rotating joint 20, which comprises the aforementioned gearbox 22, bearings 24, and seal 26.

It is desirable that a water monitor be provided in as small a package as possible, to conserve space on fire-fighting equipment and to maximize the portability of the water monitor. Accordingly, a minimal distance from the left side of the water monitor to the right side of the water monitor 10 is desirable in order for the water monitor to fit into tight spaces (e.g., between the rails of a fire-fighting ladder), especially as movable portion 16 is rotated. Accordingly, bends 1, 2 and 3 are utilized to position rotating joint 20 such that worm wheel 32 is generally centered in water monitor 10 to make relatively efficient use of space for a compact water monitor. However, this results in the aforementioned drawbacks with regard to pressure drop in the water monitor.

Figure 2:
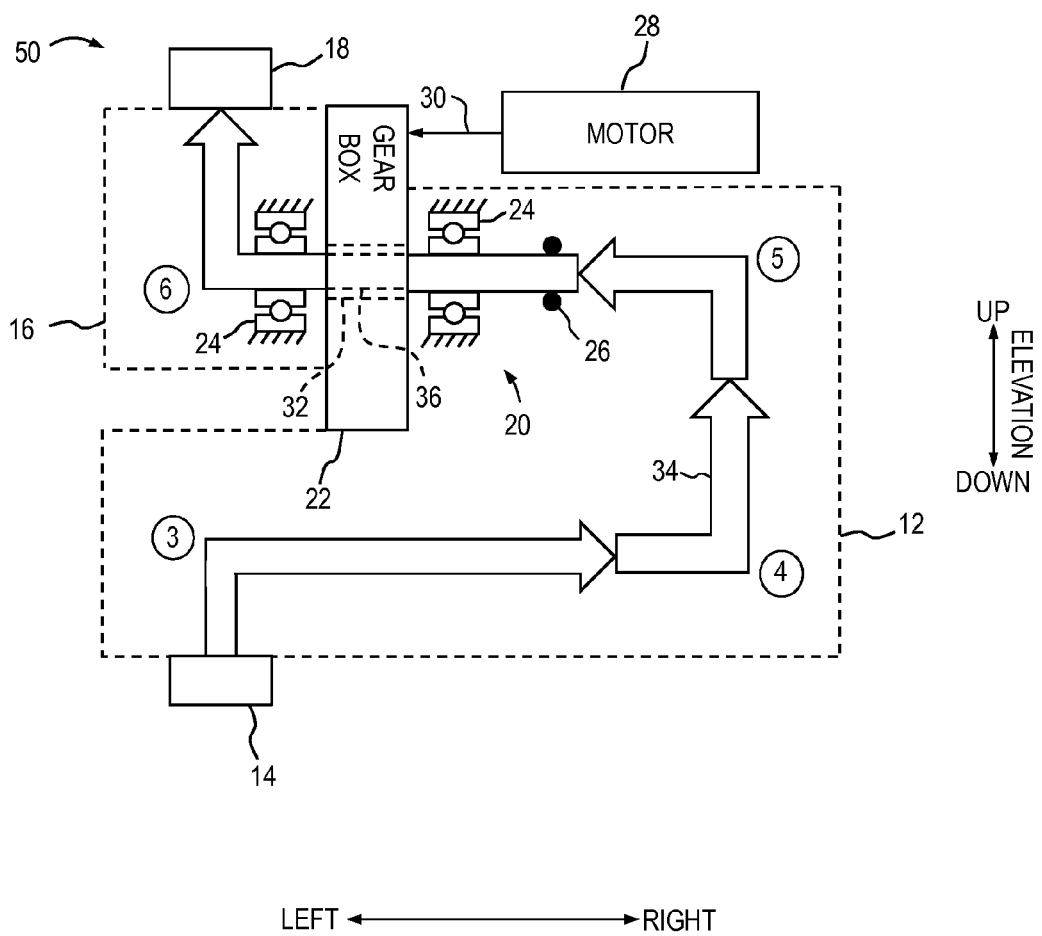
FIG. 2 is a schematic diagram of another prior art water monitor.

An alternate prior art water monitor 50 is shown in FIG. 2. In this arrangement bends 1 and 2 of water monitor 10 are eliminated by moving bends 4 and 5 to the right. This eliminates some undesirable pressure drop in water monitor 50 as compared to water monitor 10. However, the arrangement of water monitor 50 requires an undesirably large envelope for packaging the water monitor.

Figure 3:
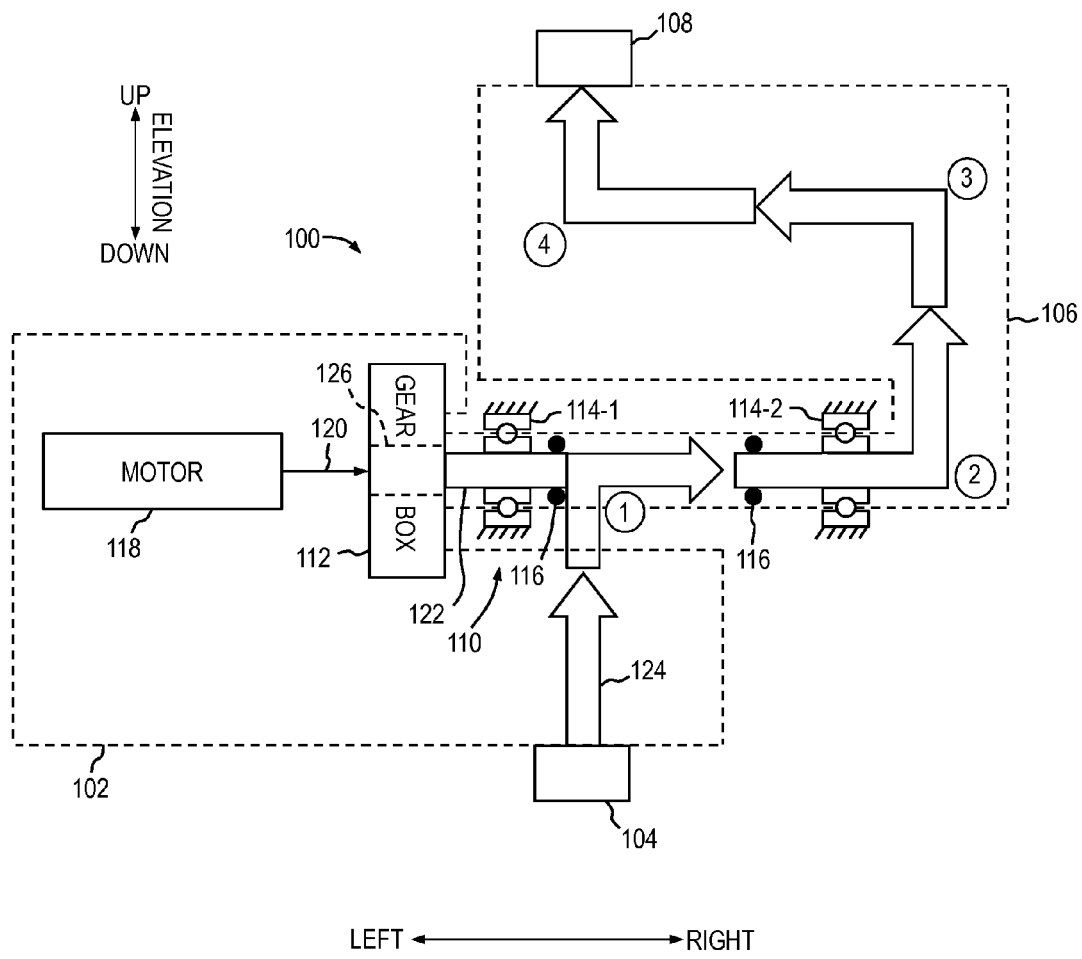
FIG. 3 is a schematic diagram of a water monitor according to an embodiment of the present invention.

A schematic block diagram of a water monitor 100 is shown in FIG. 3 according to an embodiment of the present invention. Water monitor 100 comprises a stationary portion 102 (i.e., stationary with respect to elevational movement) having a fluid inlet 104. A movable portion 106 (i.e., movable with respect to elevational movement) is rotatably coupled to the stationary portion 102, the movable portion 106 having a fluid outlet 108.

A rotating joint 110, which allows fluid outlet 108 to be positioned about an elevational axis, comprises a power transmission in the form of a gearbox 112, one or more bearings 114, and one or more seals 116. Rotating joint 110 is preferably oriented generally perpendicularly to fluid outlet 108 so that the fluid outlet is positionable about the aforementioned elevational arc.

Gearbox 112 is coupled between stationary portion 102 and movable portion 106, and converts a relatively high-speed, low-torque rotary motion from an electric motor 118 to a relatively low-speed, higher-torque output. In operation, rotary motion from an output 120 of motor 118 is converted to a relatively low-speed, higher-torque output by gearbox 112. The output of gearbox 112 is coupled to movable portion 106 such that actuating motor 118 causes the movable portion to rotate with respect to stationary portion 102, thereby moving fluid outlet 108 to a select position.

As noted above, gearbox 112 provides speed reduction and torque amplification of a motive force, such as an electric motor, similar to gearbox 22 of water monitor 10. However, unlike the configuration of water monitor 10, gearbox 112 is placed outside a fluid flow path 124 (represented by block arrows in FIG. 3) extending between fluid inlet 104 and fluid outlet 108 and configured to communicate fluids from the fluid inlet to the fluid outlet. Accordingly, gearbox 112 is coupled to movable portion 106 such that fluid flow path 124 does not extend through (i.e., "bypasses") the gearbox.

Although prior art water monitor 10 has a relatively compact package size it suffers from relatively high friction loss, resulting in an undesirable pressure drop between fluid inlet 14 and fluid outlet 18. Prior art water monitor 50 has less friction loss and pressure drop than water monitor 10, but has as a drawback a larger package size than water monitor 10. In contrast, water monitor 100 of the present invention may include a reduced number of bends in comparison to water monitor 10 while achieving a relatively compact size, the bends being shown as encircled numbers 1 through 4 of the block arrows in FIG. 3. A reduction in the number of bends in water monitor 100 results in less friction loss and reduced pressure drop in fluid flow path 124 between fluid inlet 104 and fluid outlet 108 in comparison to the pressure drops present in fluid flow path 34 of water monitor 10, which has a greater number of bends. In one embodiment, the fluid flow path 124 has no more than four bends. In addition, water monitor 100 has a package size that is smaller than water monitor 50 and is comparable in package size to water monitor 10.

In the arrangement of FIG. 3 a connector 122 may be utilized to couple gearbox 112 to movable portion 106. A first bearing 114, numbered 114-1, may be placed intermediate gearbox 112 and movable portion 106. First bearing 114-1 is preferably relatively small in physical size in order to reduce the overall package size of water monitor 100. However, a relatively large amount of torque transmitted to first bearing 114-1 by a worm gear/worm wheel 126 of gearbox 112 must be transmitted through the relatively small diameter of the first bearing. This makes the design of a robust connector 122 coupled between the worm gear/worm wheel 126 to movable portion 106 somewhat difficult because the connection is made through a relatively small diameter at first bearing 114-1, resulting in a relatively high force concentration at the first bearing. A larger bearing could be utilized for first bearing 114-1, but such bearings are not always readily available. Likewise, a relatively large bearing is preferable for an optional second bearing 114, numbered 114-2 in FIG. 3, as fluid flow path 124 passes through the center of this bearing. Specially-constructed, relatively large bearings, while feasible, are more expensive due to the inherently smaller production volumes for such components. Specially-constructed bearings are also potentially less robust because the manufacturing advantages of large volumes cannot always be utilized (e.g. hardening, grinding, etc.).

Figure 4:
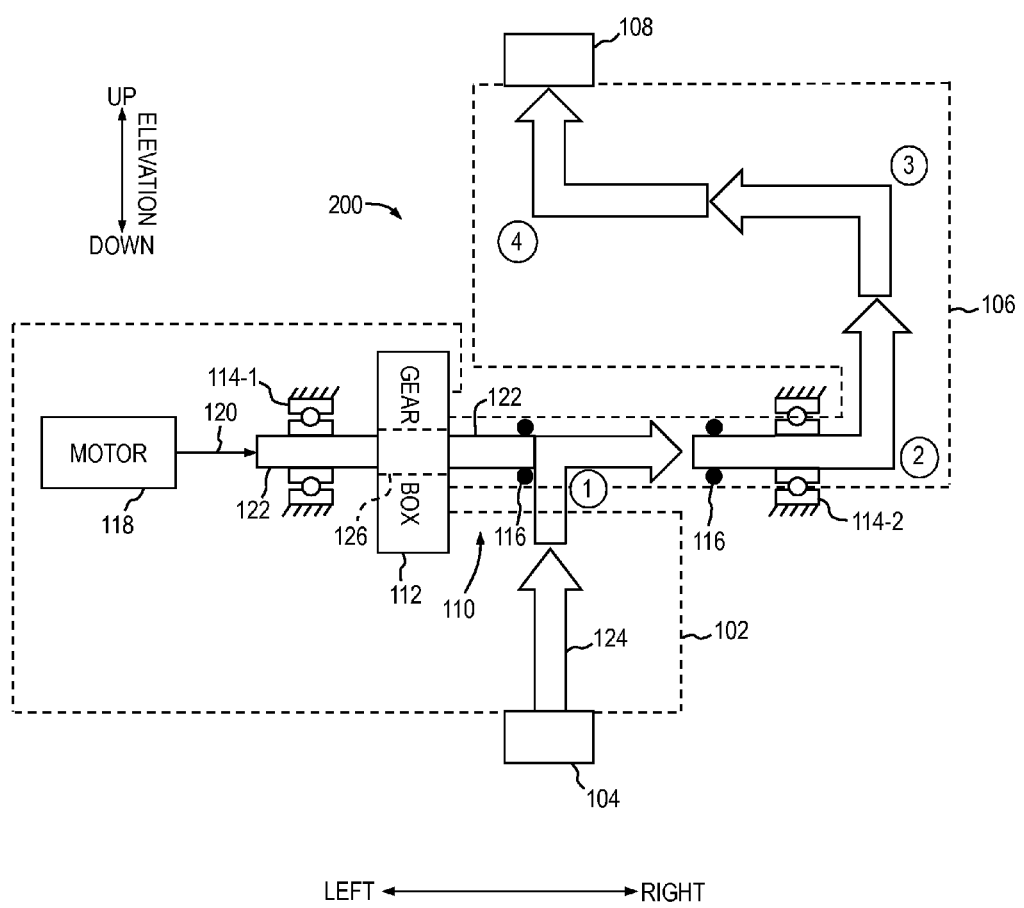
FIG. 4 is a schematic diagram of a water monitor according to another embodiment of the present invention.

A water monitor 200 is shown in FIG. 4 according to another embodiment of the present invention. In this arrangement a connector 122 configured to couple a gearbox 112 to a movable portion 106 extends through the gearbox. A first bearing 114, numbered 114-1, is placed on the opposite side of gearbox 112 with respect to the arrangement of first bearing 114-1 of FIG. 3, such that the gearbox is intermediate the first bearing and movable portion 106. A second bearing 114, numbered 114-2, is configured such that a fluid flow path 124 extends through the second bearing.

The arrangement of FIG. 4 can accommodate a physically smaller first bearing 114-1 than the arrangement of FIG. 3 because it allows the output of the worm gear/worm wheel 126 of gearbox 112 to be connected to movable portion 106 with a relatively large-diameter connector 122 without having to pass through a physically small bearing. Movable portion 106 preferably has sufficient rigidity to deter high deflections due to forces generated as a reaction force at a fluid outlet 108 of the movable portion due to forces generated by a worm gear of a worm gear/worm wheel 126 of gearbox 112.

Figure 5:
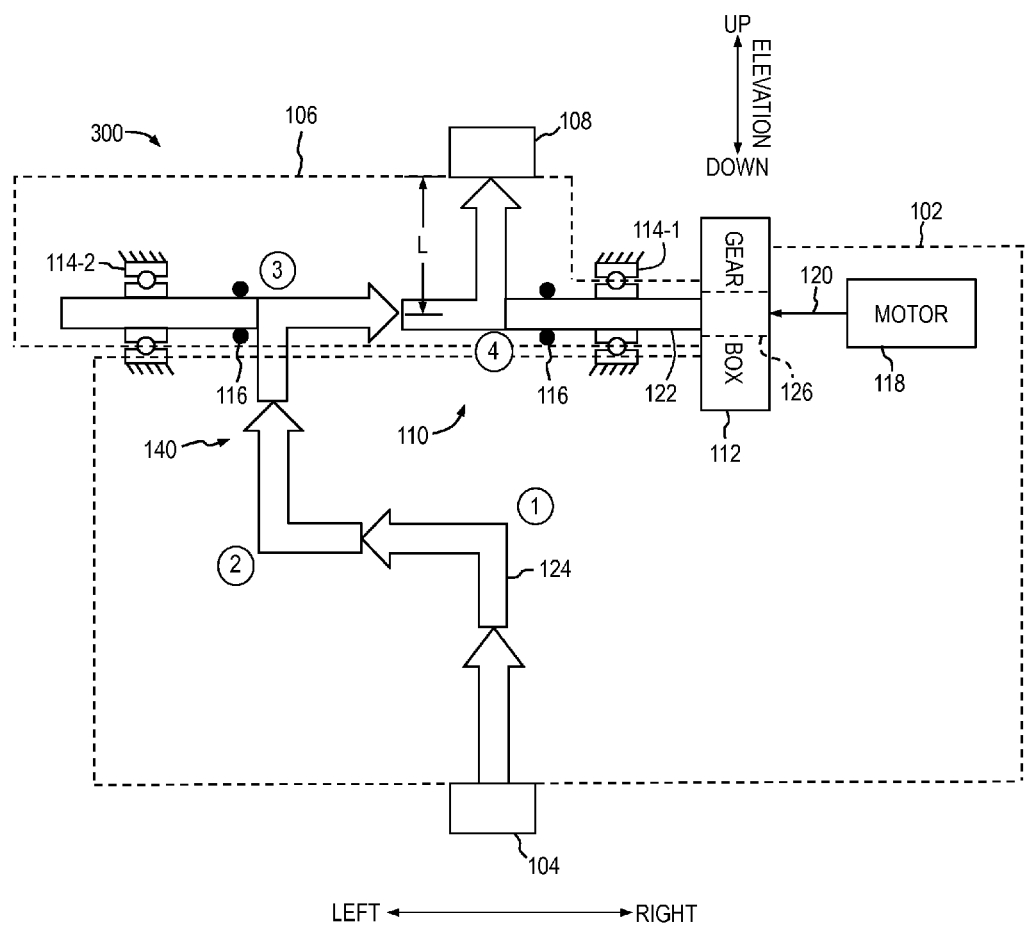
FIG. 5 is a schematic diagram of a water monitor according to yet another embodiment of the present invention.

A water monitor 300 is shown in FIG. 5 according to yet another embodiment of the present invention. In this arrangement a worm gear/worm wheel 126 is placed on the opposite end of a rotating joint 110 with respect to the configurations of FIGS. 3 and 4. A connector 122 is configured to couple a gearbox 112 to a movable portion 106. A first bearing 114, numbered 114-1, is intermediate gearbox 112 and movable portion 106. A second bearing 114, numbered 114-2, is configured such that a fluid flow path 124 does not extend through (i.e., "bypasses") the second bearing.

With continued reference to FIG. 5, a length "L" is the distance from the center of a rotating joint 110 to a fluid outlet 108 of movable portion 106. Typically, a nozzle (not shown) is attached to fluid outlet 108. Such nozzles typically have a significant weight associated with structural reinforcements made to withstand the forces that are present when fluid is flowing through the water monitor. This weight, multiplied by length "L," creates a lifting moment that gearbox 112 and a motor 118, driving the gearbox, must overcome. If the length "L" is shortened, the lifting moment required to be overcome is lowered and therefore, the torque required of gearbox 112 and motor 118 is reduced. However, gearbox 112 can be more complex to package in this arrangement due to the need to provide support structure for gearbox 112, bearings 114, any seals 116, and motor 118.

Figure 6:
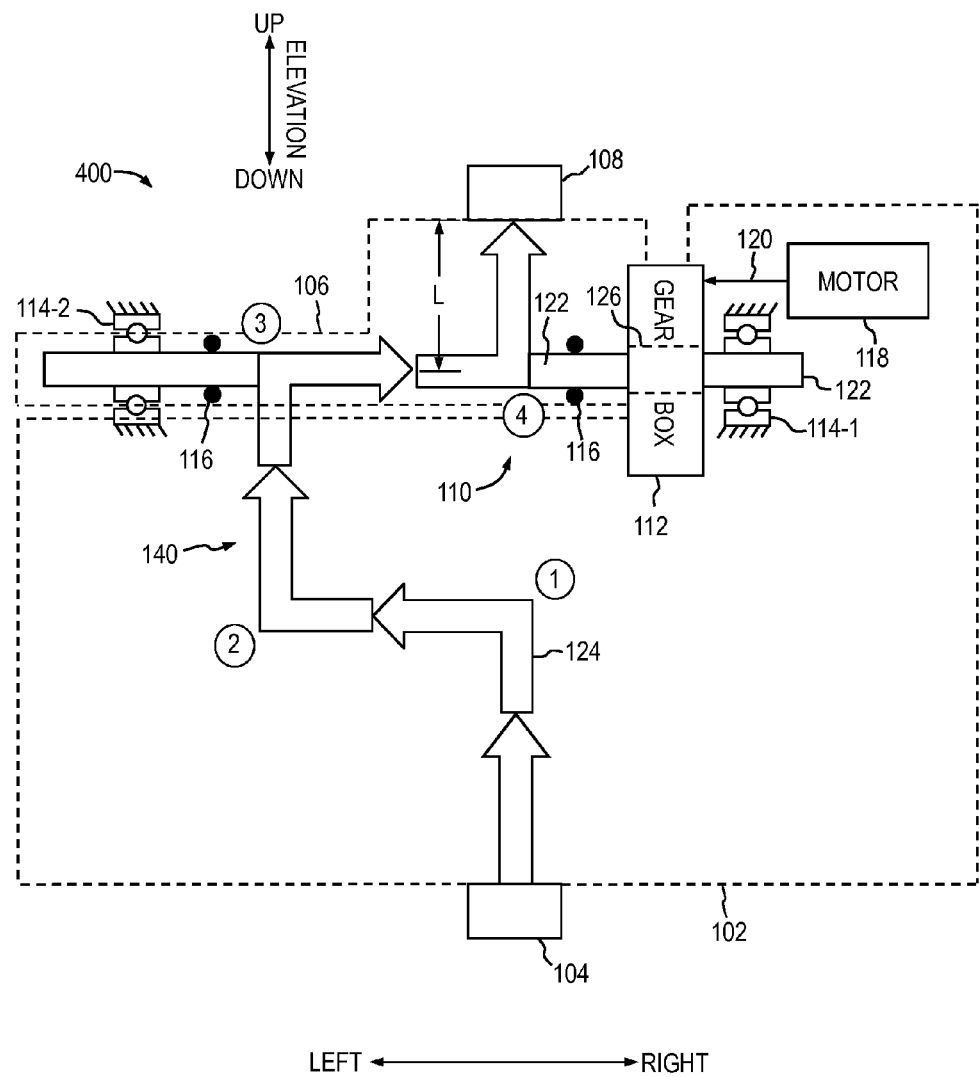
FIG. 6 is a schematic diagram of a water monitor according to still another embodiment of the present invention.

A slight re-arrangement of water monitor 300 is schematically depicted in FIG. 6 as water monitor 400. Water monitor 400 is configured such that a first bearing 114, numbered 114-1, is placed on the opposite side of a gearbox 112 with respect to the arrangement of first bearing 114-1 of FIG. 5 such that the gearbox is intermediate the first bearing and a movable portion 106. A connector 122 configured to couple gearbox 112 to movable portion 106 extends through the gearbox. A second bearing 114, numbered 114-2, is configured such that a fluid flow path 124 does not extend through (i.e., "bypasses") the second bearing.

The arrangement of FIG. 6 combines the advantages of water monitor 300 (e.g., a relatively short length "L" resulting in a lower lifting moment) with the advantages of water monitor 200 (e.g., a relatively large worm gear/worm wheel 126 and connector 122 from gearbox 112 to movable portion 106). Movable portion 106 preferably is designed to have sufficient rigidity to deter high deflections due to forces generated as a reaction force at fluid outlet 108 and due to forces generated by worm gear/worm wheel 126.

Figure 7:
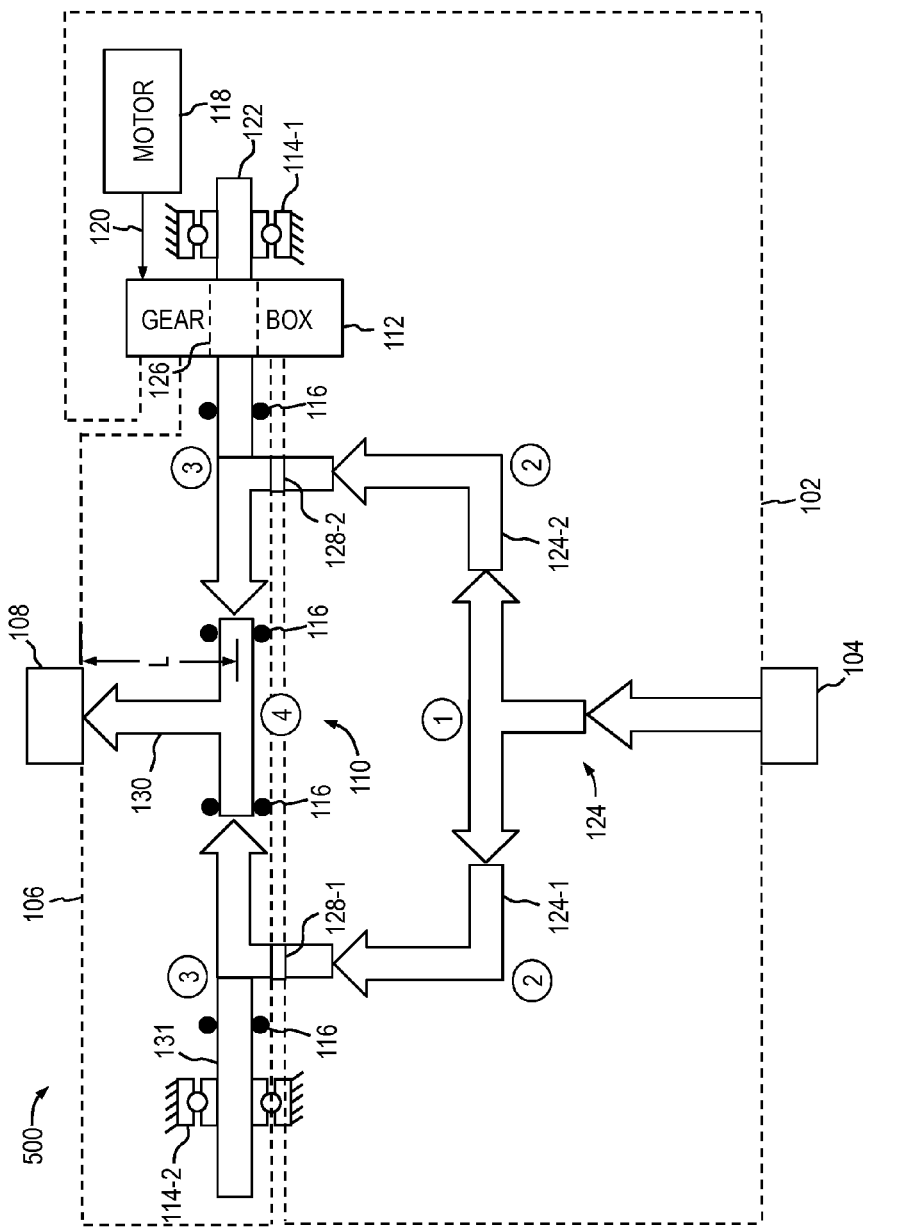
FIG. 7 is a schematic diagram of a water monitor according to yet another embodiment of the present invention.

A water monitor 500 is shown in FIG. 7 according to yet another embodiment of the present invention. In this arrangement a connector 122 configured to couple a gearbox 112 to a movable portion 106 extends through the gearbox. A first bearing 114, numbered 114-1, is arranged such that gearbox 112 is intermediate the first bearing and movable portion 106. A fluid flow path 124 is divided into two smaller, generally equal paths numbered 124-1 and 124-2. Moveable portion 106 includes a pair of intakes 128, numbered 128-1 and 128-2, for fluid flowing in fluid flow paths 124-1, 124-2 respectively to enter the moveable portion. The two smaller fluid flow paths 124-1, 124-2 join one another to form a fluid flow path 130 once they have passed through joint 110 and entered moveable portion 106. A second bearing 114, numbered 114-2, is coupled to a bearing support 131. Second bearing 114-2 is preferably configured such that fluid flow path 124 does not extend through (i.e., "bypasses") the second bearing.

An advantage of water monitor 500 is that the forces acting on moveable portion 106 due to the change of momentum of fluid flowing in fluid flow paths 124-1, 124-2 and pressure acting on elevation joint 110 are generally equal and opposite, and therefore, substantially cancel one other. Accordingly, the torque required of a motor 118 and gearbox 112 to position an outlet 108 is greatly reduced.

Figure 8:
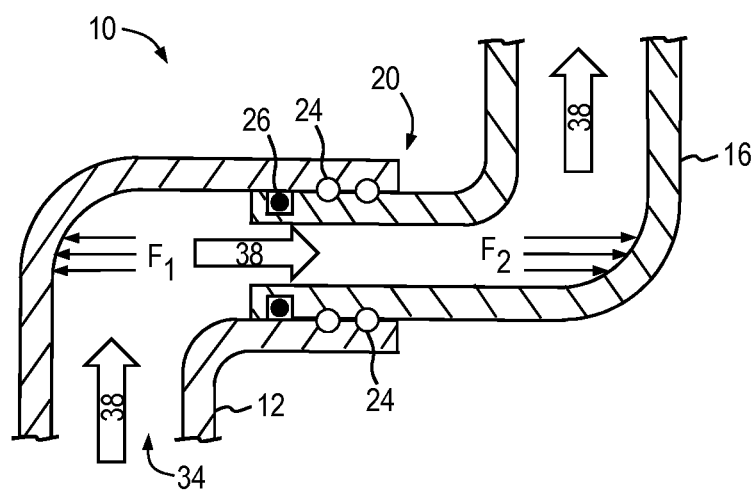
FIG. 8 is a sectional representation of a portion of a prior art water monitor, showing coupling of stationary and movable portions of the water monitor.

With reference to FIG. 8, fluid flow path 34 of prior art water monitor 10 typically comprises one or more bearings 24 and seals 26 interposed between stationary portion 12 and movable portion 16. A significant drawback of this arrangement is that fluid 38 (represented as block arrows in FIG. 8) flowing along fluid flow path 34 at high pressure exerts opposing separating forces $F_1$, $F_2$ between the stationary and movable portions 12, 16 respectively, thereby increasing the load imposed upon bearings 24. This increased bearing load adds to the mechanical load imposed upon gearbox 22 and electric motor 28 (FIG. 1), and can result in increased wear and reduced service life for the bearings, motor, and gearbox components.

Figure 9:
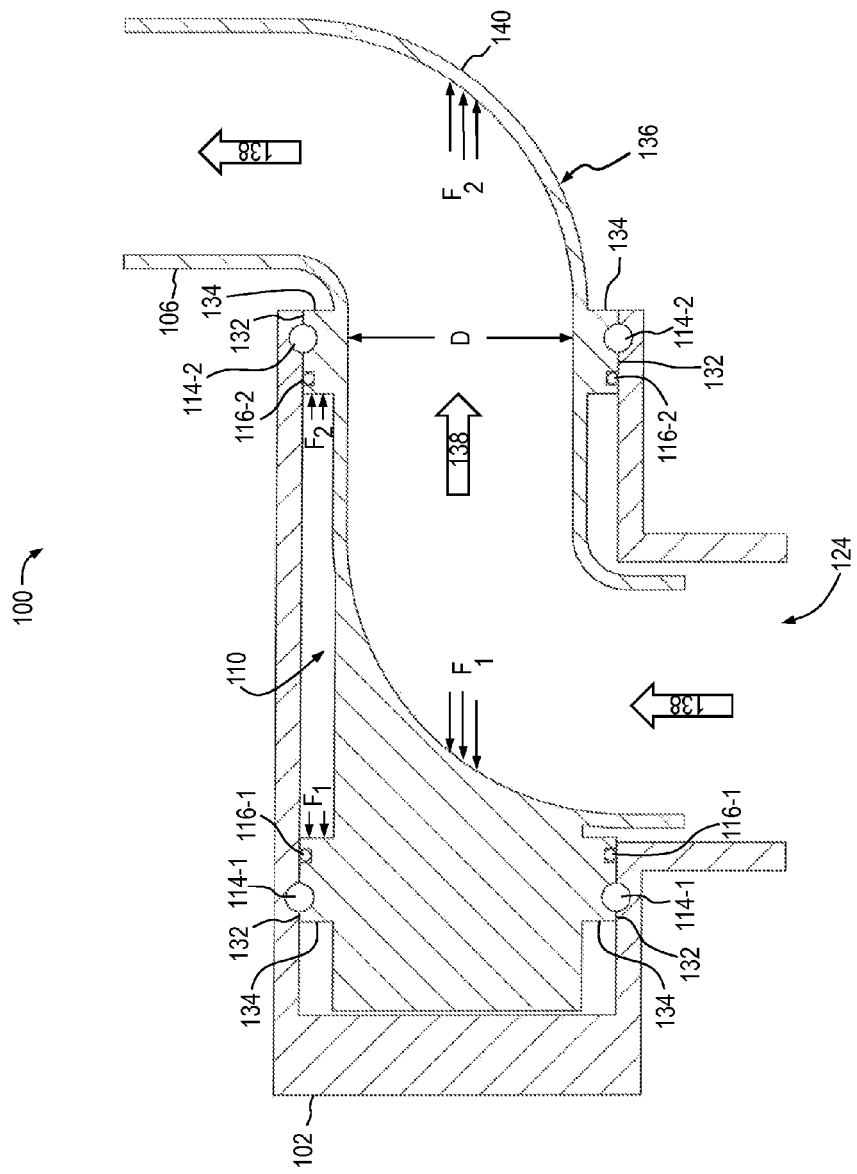
FIG. 9 is a sectional representation of a portion of a water monitor according to an embodiment of the present invention, showing coupling of stationary and movable portions of the water monitor.

With reference to FIGS. 3 and 9 together, water monitor 100 may include a stationary portion 102 having a fluid inlet 104, a first portion of a fluid flow path 124 extending therethrough, and one or more first interfaces 132. A movable portion 106 includes a second portion of fluid flow path 124 extending therethrough, a fluid outlet 108, and one or more second interfaces 134. Corresponding first and second interfaces 132, 134 respectively are each rotatably coupled together by a bearing 114, first and second bearings being numbered 114-1 and 114-2 respectively. One or more seals 116 intermediate corresponding first and second interfaces 132, 134 respectively provides a barrier to deter fluid flowing in fluid flow path 124 from escaping. Movable portion 106 is rotatable with respect to stationary portion 102 to position fluid outlet 108. In addition, fluid inlet 104, fluid flow path 124, and fluid outlet 108 are each in communication with one another and are configured to conduct fluids therethrough.

With continued reference to FIG. 9, in contrast to water monitor 10 of FIG. 8, water monitor 100 includes a "force-balanced" arrangement comprising a piece 136. The force applied to first and second bearings 114-1 and 114-2 respectively due to the water pressure $F_1$, $F_2$ of fluid 138 (represented by block arrows in FIG. 9) acting on a projected diameter "D" on opposite sides of fluid flow path 124 in piece 136 is minimal. Ideally, this force is nearly zero if the diameters of seals 116, first and second seals being numbered 116-1, 116-2 respectively, are equal (that is, the projected areas of both seals are equal). Typically, one seal is slightly smaller than the other seal for manufacturability to reduce the risk of cutting the seals during assembly. "Force-balanced" may also be termed "pressure-balanced" in the sense that a load applied to rotating joint 110 by the pressure of fluid 138 is balanced by a load pushing on the same member in the opposite direction.

Piece 136 may be made as a unitary component. Alternatively, piece 136 may be made from separate components that are joined together.

Figure 10:
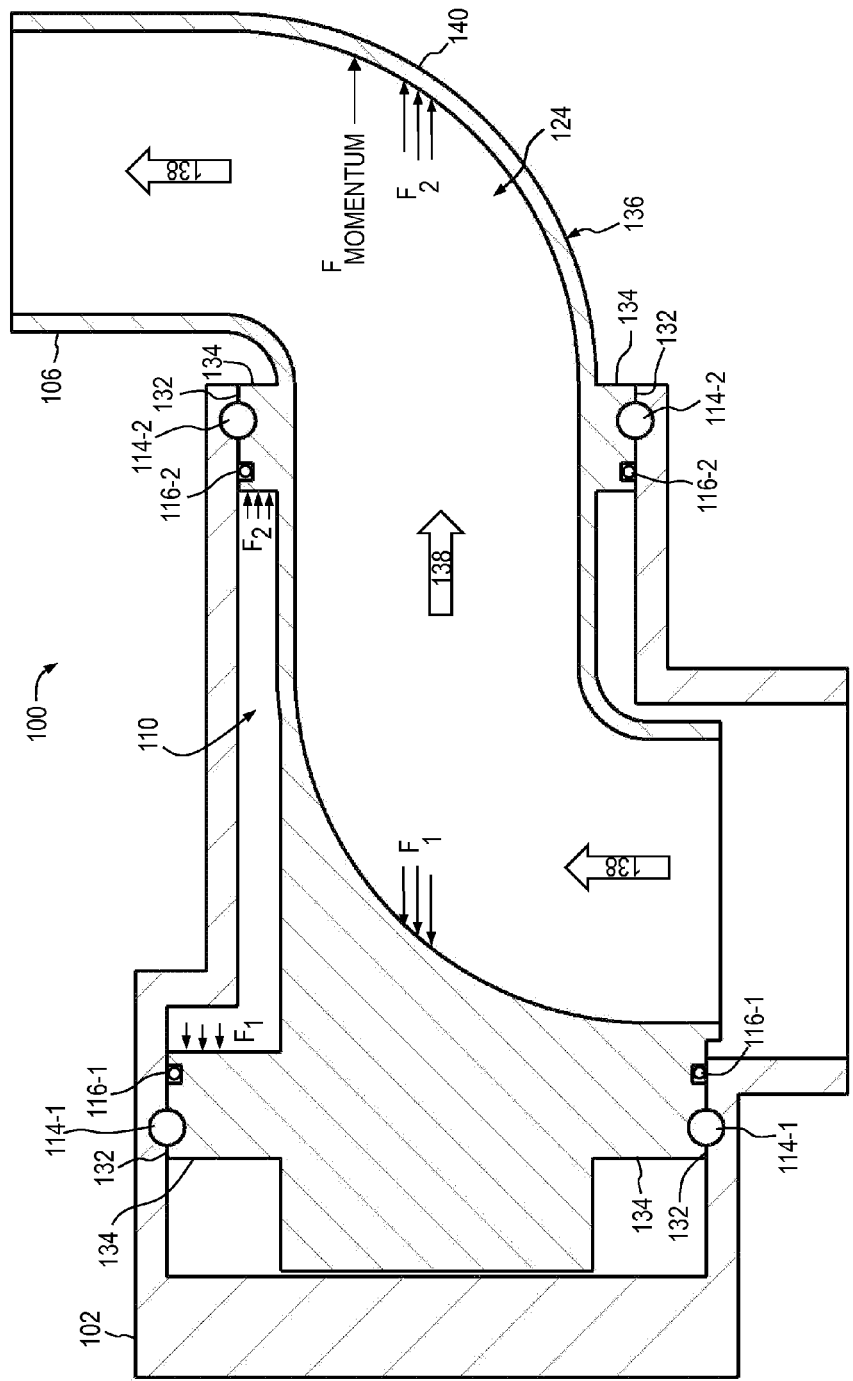
FIG. 10 is a sectional representation of a portion of a water monitor according to another embodiment of the present invention, showing coupling of stationary and movable portions of the water monitor.

A slight variation on the arrangement of FIG. 9 can be seen in FIG. 10. In FIG. 10, fluid 138 flowing along fluid path 124 at high pressure exerts opposing forces $F_1$, $F_2$ on a piece 136 rather than exerting a separating force upon bearings 114. When the fluid 138 flow turns at a bend or "elbow" 140 there is a force in the direction of $F_2$ due to the change in direction of the momentum of the fluid as it turns in the elbow to exit the elbow. The momentum change creates a force in the direction of $F_2$ which acts on movable portion 106 and creates a load on bearings 114, a first bearing being numbered 114-1 and a second bearing being numbered 114-2. The diameter of a first seal 116, numbered 116-1, may be increased relative to the diameter of a second seal 116, numbered 116-2, to counteract this change in the direction of momentum. By increasing the diameter of first seal 116-1, the projected area upon which the water pressure is applied increases and, therefore, the force, $F_1$ acts in the opposite direction of a force $F_{momentum}$ created by the change in momentum. $F_{momentum}$ may be calculated using Equation 1, below.

$$F_{momentum} = \rho Q (\mu_2 - \mu_1) \qquad \text{Equation 1}$$

where: $\rho$=Density of fluid 138
Q=Volumetric flow rate of fluid 138
$\mu_1$=Starting velocity of fluid 138 at input to piece 136
$\mu_2$=Final velocity of fluid 138 at output of (exit from) piece 136

The load applied to bearings 114-1 and 114-2 can be minimized by balancing $F_1$ and $F_{momentum}+F_2$. In other words:

$$F_1 = F_2 + F_{momentum} \qquad \text{Equation 2}$$

where: $F_1 = \rho A_1$
$F_2 = \rho A_2$
$\rho$=Density of fluid 138
$A_1$=Area inside first seal 116-1
$A_2$=Area inside second seal 116-2

The outside diameter of seals 116-1 and 116-2 may be utilized to calculate the area.

Figure 15:
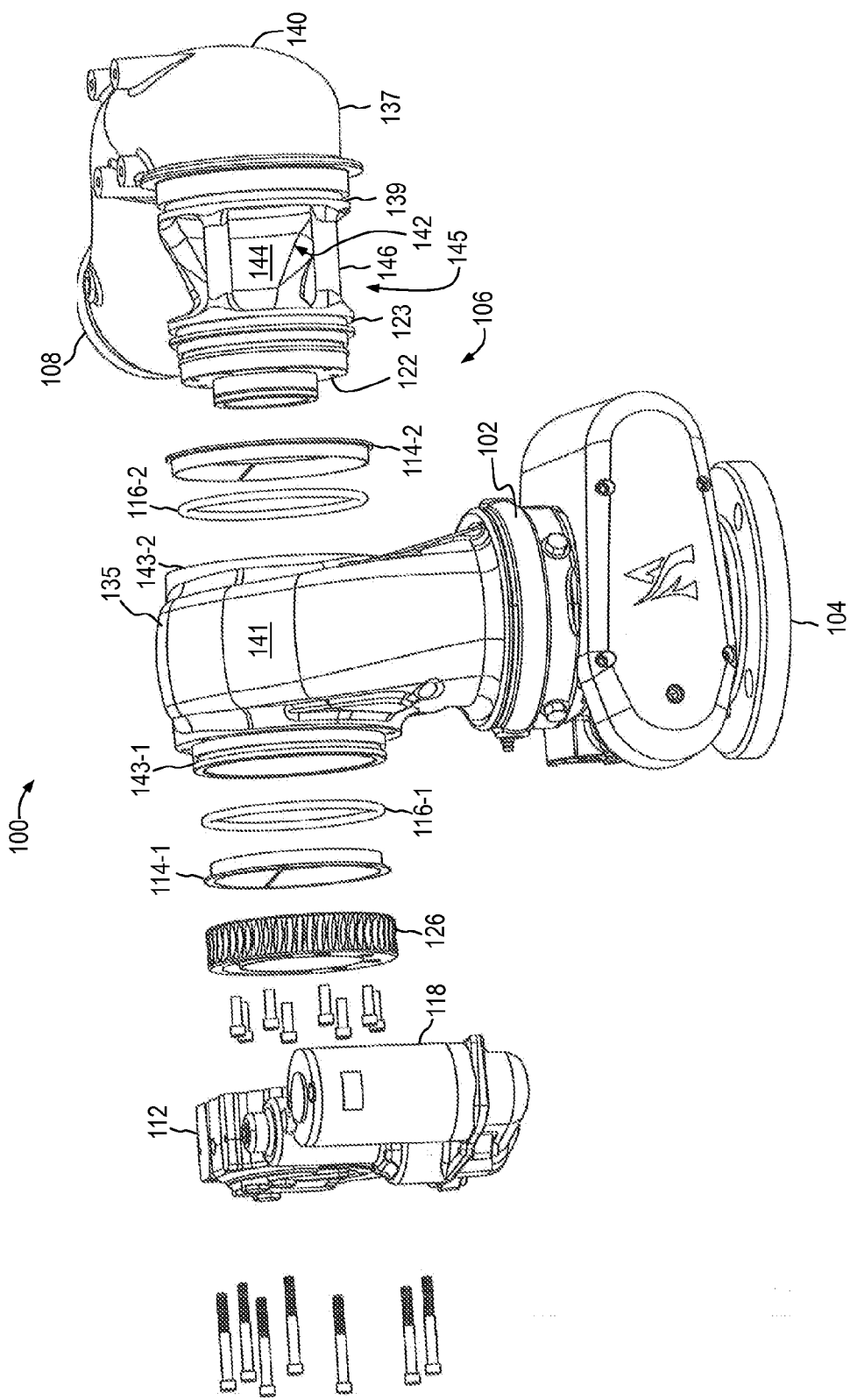
FIG. 15 is an exploded view of a water monitor according to an embodiment of the present invention.

With reference to FIGS. 9, 10 and 11A-11E, movable portion 106 is preferably configured to withstand the opposing forces $F_1$, $F_2$ created from high pressure exerted on the unitary piece 106 by fluid 138. An opening 142 in an inlet portion 145 of movable portion 106 is preferably is designed to have sufficient size to allow fluid 138 to enter movable portion 106 when fluid outlet 108 is rotated to a desired elevation position with minimal restriction to the fluid flow moving from stationary portion 102 into the movable portion. With reference to FIGS. 11A-11E, 12A-12C, 13A-13C, 14A-14B and 15, in one embodiment the movable portion 106 includes a first piece 135 rotatably coupled to the stationary portion 102 and a second piece 137 rotatably coupled to the first piece 135. The first piece 135 includes a casing 141 configured as a conduit of fluid 138 as part of flow path 124. Referring to FIGS. 14A-14B, the casing 141 is configured to receive the inlet portion 145 of second piece 137. Casing 141 includes two opposing sleeves 143-1, 143-2. Inlet portion 145 is configured to extend through the first sleeve 143-1 and the second sleeve 143-2. Second piece 137 is configured to rotatably couple to and seal against sleeves 143-1, 143-2. Further, worm gear 126 of gearbox 112 (see also FIG. 15) is an annular member configured to receive inlet portion 145 and to couple to the inlet portion adjacent first sleeve 143-1. Connector 122 extends from an end of the second piece 137 and is configured to be coupled to annular worm gear 126 of gearbox 112 proximate the opening 142. As can be seen from FIG. 14B, connector 122 extends within the first piece 135 to the gearbox 112 of the power transmission. The connector 122 also includes an end portion 123 proximate the fluid path 124 at opening 142. End portion 123 is configured to receive seal 116-1 and is rotatably coupled to sleeve 143-1. The second piece 137 further includes a coupling 139 proximate the fluid path 124 at opening 142, the coupling being spaced apart from end portion 123. Coupling 139 is configured to receive seal 116-2 and is rotatably coupled to sleeve 143-2. In one embodiment the coupling 139 is rotatably coupled to sleeve 143-2 at an angle of about 90 degrees relative to the fluid inlet 104 of the first piece 135.

With reference to FIGS. 11A-11E, 13A-13C, and 14A-14B, a structural support 144 may be utilized in movable portion 106. Structural support 144, is a generally semi-circularly shaped structure proximate the fluid flow path 124, and is preferably situated so that it does not significantly interfere with the flow of fluid 138 in fluid flow path at various positions selected for movable portion 106. In one embodiment a periphery of the inlet portion 145 of second piece 137 includes structural support 144, and the structural support extends from end portion 123 to coupling 139. Structural support 144 also extends from a periphery 125 of the end portion 123 to a central region 127 of the end portion.

In some embodiments of the present invention one or more rod-like structures may be positioned proximate fluid flow path 124. For example, one or more tension rods 146 may be used in fluid flow path 124 to provide additional structural integrity to withstand the opposing forces $F_1$, $F_2$ that are applied to generate a tension "T" in movable portion 106. By adding tension rods 146, a larger opening 142 can be formed next to structural support 144. This results in less restriction to fluid 138 flow when movable portion 106 (and thus outlet 108) is moved to its extreme positions. In one embodiment a periphery of the inlet portion 145 of second piece 137 includes one or more structural tension rods 146, configured such that the tension rods extend from end portion 123 to coupling 139.

The general arrangement of an exemplary water monitor 100 is shown in FIGS. 12A-12C, 13A-13C, 14A-14B and 15 according to an embodiment of the present invention. As shown, portions 102, 106 of water monitor 100 may be made rotatable about an azimuth-adjustment axis, labeled an "X" axis and having a turning radius "TR" in the drawings, and movable portion 106 may be made further rotatable about an elevation-adjustment axis, labeled a "Y" axis in the drawings. During use of water monitor 100 the X-axis may be oriented generally horizontal while the Y-axis may be oriented generally vertical. However, this is not a requirement and other orientations of water monitor 100 are envisioned within the scope of the invention.

As described herein, an electric motor 118 is utilized to position movable portion 106 about the Y-axis. However, one skilled in the art will appreciate that any suitable form of motive power may be substituted for electric motor 118 including, without limitation, water-powered motor drives, hydraulic drives, pneumatic actuators and manual handwheels.

One skilled in the art will also appreciate that the components of water monitor 100 may be rearranged to fit a particular need. For example, gearbox 112 and motor 118 may be moved to positions opposite that shown in the figures. Similarly, in an alternate embodiment a member may be extended from movable portion 106 to gearbox 112 through fluid flow path 124 to effect positioning of the movable portion by the gearbox.

In some embodiments of the present invention sleeve-type bearings 114 may be utilized. With reference to FIGS. 14A and 14B, a first sleeve bearing 114-1 is coupled to movable portion 106 and rides against stationary portion 102. A second sleeve bearing 114-2 is assembled to movable portion 106 and likewise rides against stationary portion 102. First sleeve bearing 114-1 may also be held captive by the worm wheel of worm gear/worm wheel 126 of gearbox 112, as shown in FIGS. 14A and 14B. Sleeve bearings 114-1, 114-2 are preferably made of a durable, self-lubricating material for long service life and low friction.

Gearbox 112 is described herein as a worm-worm wheel arrangement for purposes of explanation. However, any suitable type of power transmission may be utilized within the scope of the invention. Example power transmissions include, without limitation, spur gears, planetary gears, pulleys and belts, pneumatic and hydraulic devices, and sprockets and chains in addition to a worm-worm wheel.

The various components of water monitors 100, 200, 300, 400 and 500 may be formed using any suitable materials including, without limitation, metal, composites and plastic. In addition, the components of water monitors 100, 200, 300, 400 and 500 may be fabricated using any preferred processes such as, but not limited to, machining, casting, forging, molding and spinning. Furthermore, water monitors 100, 200, 300, 400 and 500 may be finished in any desired manner such as, but not limited to, painting, plating, dyes, molded-in colors, or may be left unfinished.

While this invention has been shown and described with respect to a detailed embodiment thereof, it will be understood by those skilled in the art that changes in form and detail thereof may be made without departing from the scope of the claims of the invention.

What is claimed is:

1. A water monitor, comprising:
a stationary portion having a fluid inlet;
a movable portion having a first piece rotatably coupled to the stationary portion and a second piece rotatably coupled to the first piece,
the first piece having a first sleeve and an opposing second sleeve configured to rotatably couple to the second piece;
and the second piece having an inlet portion and a fluid outlet, the inlet portion including a fluid opening and configured to extend through the first sleeve and the second sleeve;
a fluid flow path extending between the fluid inlet and the fluid outlet, the fluid flow path being configured to communicate fluids from the fluid inlet to the fluid outlet; and
a power transmission coupled to the inlet portion adjacent the first sleeve,
the fluid flow path bypassing the power transmission, and
the movable portion being rotatable with respect to the stationary portion to position the fluid outlet.

2. The water monitor of claim 1 wherein the second piece includes a first bend and a second bend in the fluid flow path.

3. The water monitor of claim 1 wherein the second piece is a unitary component.

4. The water monitor of claim 1 wherein the power transmission includes an annular gear configured to receive the inlet portion within.

5. The water monitor of claim 4 wherein the annular gear is a worm gear.

6. The water monitor of claim 4 wherein the inlet portion includes a connector configured for coupling to the annular gear.

7. The water monitor of claim 1, further comprising an electric motor coupled to the power transmission.

8. The water monitor of claim 1 wherein the fluid flow path comprises four bends or less.

9. The water monitor of claim 1, further including at least one bearing intermediate the first piece and the second piece.

10. The water monitor of claim 9 wherein the bearing is a sleeve bearing.

11. The water monitor of claim 10 wherein the sleeve bearing is retained by the power transmission.

12. The water monitor of claim 1, further including at least one seal intermediate the inlet portion and at least one of the first sleeve and the second sleeve.

13. The water monitor of claim 1, further including a generally semi-circularly shaped structure proximate the fluid flow path at the inlet portion.

14. The water monitor of claim 1 wherein the inlet portion includes a coupling spaced apart from an end portion, the end portion configured to be rotatably coupled to the first sleeve, and the coupling configured to be rotatably coupled to the second sleeve.

15. The water monitor of claim 14 wherein a semi-circularly shaped structure extends from the end portion to the coupling.

16. The water monitor of claim 15 wherein the semi-circularly shaped structure extends from a periphery of the end portion to a central region of the end portion.

17. The water monitor of claim 1, further including a rod-like structure proximate the fluid flow path at the inlet portion.

18. The water monitor of claim 17 wherein the rod-like structure extends from an end portion to a coupling of the inlet portion, the end portion configured to be rotatably coupled to the first sleeve and the coupling configured to be rotatably coupled to the second sleeve.

19. A water monitor, comprising:
a stationary portion having a fluid inlet;
a movable portion having a first piece rotatably coupled to the stationary portion and a second piece rotatably coupled to the first piece,
the second piece having an inlet portion and a fluid outlet, the inlet portion including a fluid opening and configured to extend through the first piece;

a fluid flow path extending between the fluid inlet and the fluid outlet, the fluid flow path being configured to communicate fluids from the fluid inlet to the fluid outlet; and a power transmission including an annular gear coupled to the inlet portion proximate to the fluid opening, the fluid flow path bypassing the annular gear, and the movable portion being rotatable with respect to the stationary portion to position the fluid outlet.

20. A method for making a water monitor, comprising:

obtaining a stationary portion having a fluid inlet;

obtaining a movable portion having a first piece and a second piece, the first piece having a first sleeve and an opposing second sleeve, and the second piece having an inlet portion and a fluid outlet, the inlet portion including a fluid opening;

rotatably coupling the first piece to the stationary portion;

extending the inlet portion of the second piece through the first sleeve and the second sleeve;

rotatably coupling the inlet portion to the first sleeve and the second sleeve;

extending a fluid flow path between the fluid inlet and the fluid outlet, the fluid flow path being configured to communicate fluids from the fluid inlet to the fluid outlet; and and coupling a power transmission to the inlet portion adjacent the first sleeve such that the fluid flow path bypasses the power transmission, and rotating the movable portion with respect to the stationary portion to position the fluid outlet.

* * * * *